United States Patent
Inoue

(10) Patent No.: US 9,914,343 B2
(45) Date of Patent: Mar. 13, 2018

(54) ELECTRICAL WIRE GUIDING APPARATUS AND DECORATIVE LIGHTING PART HOLDER

(71) Applicant: Sumitomo Wiring Systems, Ltd., Yokkaichi, Mie (JP)

(72) Inventor: Hiroshi Inoue, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 79 days.

(21) Appl. No.: 15/259,728

(22) Filed: Sep. 8, 2016

(65) Prior Publication Data

US 2017/0070037 A1   Mar. 9, 2017

(30) Foreign Application Priority Data

Sep. 9, 2015   (JP) .................. 2015-177534

(51) Int. Cl.
| | |
|---|---|
| *H02G 3/04* | (2006.01) |
| *B60J 5/04* | (2006.01) |
| *F21S 4/26* | (2016.01) |
| *F21V 23/00* | (2015.01) |
| *B60L 1/14* | (2006.01) |
| *B60R 13/00* | (2006.01) |
| *F21W 121/00* | (2006.01) |
| *F21Y 115/10* | (2016.01) |

(52) U.S. Cl.
CPC ............. *B60J 5/047* (2013.01); *B60L 1/14* (2013.01); *B60R 13/00* (2013.01); *F21S 4/26* (2016.01); *F21V 23/001* (2013.01); *H02G 3/0475* (2013.01); *F21W 2121/00* (2013.01); *F21Y 2115/10* (2016.08)

(58) Field of Classification Search
None
See application file for complete search history.

(56) References Cited

U.S. PATENT DOCUMENTS

2003/0103349 A1*   6/2003   Lin .................... F21S 4/20
362/249.03

FOREIGN PATENT DOCUMENTS

JP   2015074307 A   4/2015

* cited by examiner

*Primary Examiner* — Britt D Hanley
(74) *Attorney, Agent, or Firm* — Reising Ethington, P.C.

(57) ABSTRACT

A long and thin decorative lighting part is attached to an electrical wire guiding body without causing a hindrance to curving deformation of the electrical wire guiding body. An electrical wire guiding apparatus includes a long and thin electrical wire guiding body that receives insertion of a wire harness (electrical wires) and can undergo curving deformation, and holders, each of which has lock portions (leg portions and locking end portions) that can be locked to the outer surface of the electrical wire guiding body, and a holding portion that can hold a decorative lighting part. When the decorative lighting part is to be attached to the electrical wire guiding body, it is sufficient to hold the decorative lighting part in the holders and then lock the holders to the electrical wire guiding body.

11 Claims, 10 Drawing Sheets

ELECTRICAL WIRE GUIDING APPARATUS AND DECORATIVE LIGHTING PART HOLDER

This application claims the benefit of Japanese Application No. JP2015-177534, filed on Sep. 9, 2015, the contents of which are hereby incorporated by reference in their entirety.

FIELD

The present invention relates to an electrical wire guiding apparatus and a decorative lighting part holder.

BACKGROUND

JP 2015-074307A discloses an electrical wire guiding apparatus that is provided so as to span a vehicle body and a sliding door in an approximately horizontal manner. This electrical wire guiding apparatus is configured to include an electrical wire guiding body that is configured by coupling multiple link members in a single line and is capable of undergoing curving deformation. A wire harness for supplying electrical power to electrical components and the like installed in the sliding door is inserted into the electrical wire guiding body.

Some automobile users attach a long and thin decorative lighting part that uses LEDs to the body of their vehicle. By attaching this type of decorative lighting part to the electrical wire guiding body, it can be effectively used as a means for preventing a passenger from mistakenly stepping on the electrical wire guiding body when entering or exiting at night. However, the electrical wire guiding body undergoes curving deformation as the sliding door opens and closes, and therefore the decorative lighting part cannot be adhered using double sided tape or the like.

The present design was achieved in light of the above-described situation, and an object thereof is to attach a long and thin decorative lighting part to an electrical wire guiding body without causing a hindrance to curving deformation of the electrical wire guiding body.

SUMMARY

An electrical wire guiding apparatus according to a first embodiment includes: an electrical wire guiding body that is long and thin, receives insertion of an electrical wire, and is capable of undergoing curving deformation; and a holding means capable of holding a decorative lighting part to the electrical wire guiding body.

A decorative lighting part holder according to a second embodiment is a decorative lighting part holder in which an electrical wire guiding apparatus is configured by attaching the decorative lighting part holder to an electrical wire guiding body that is long and thin, receives insertion of an electrical wire, and is capable of undergoing curving deformation, and the decorative lighting part holder comprises a lock portion capable of being locked to an outer surface of the electrical wire guiding body, and a holding portion capable of holding the decorative lighting part.

According to the first embodiment, the holding means capable of holding the decorative lighting part to the electrical wire guiding body is provided, and therefore the long and thin decorative lighting part can be attached to the electrical wire guiding body without using a member such as double sided tape that causes a hindrance to curving deformation of the electrical wire guiding body. Also, according to the second embodiment, when the decorative lighting part is to be attached to the electrical wire guiding body, it is sufficient to hold the decorative lighting part in the holder and then lock the holder to the electrical wire guiding body. Accordingly, with the second embodiment, the long and thin decorative lighting part can be attached to the electrical wire guiding body without using a member such as double sided tape that causes a hindrance to curving deformation of the electrical wire guiding body.

DRAWINGS

DESCRIPTION

Figure 1:
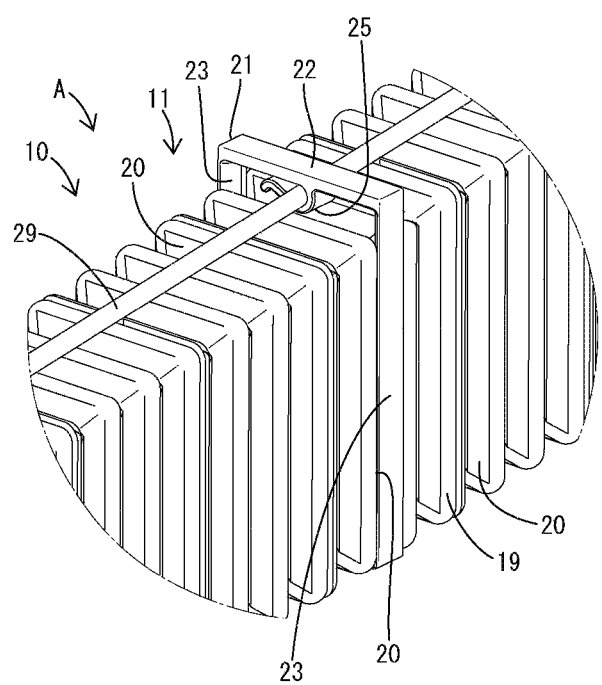
FIG. 1 is a perspective view of an electrical wire guiding apparatus according to a first embodiment.
Figure 2:
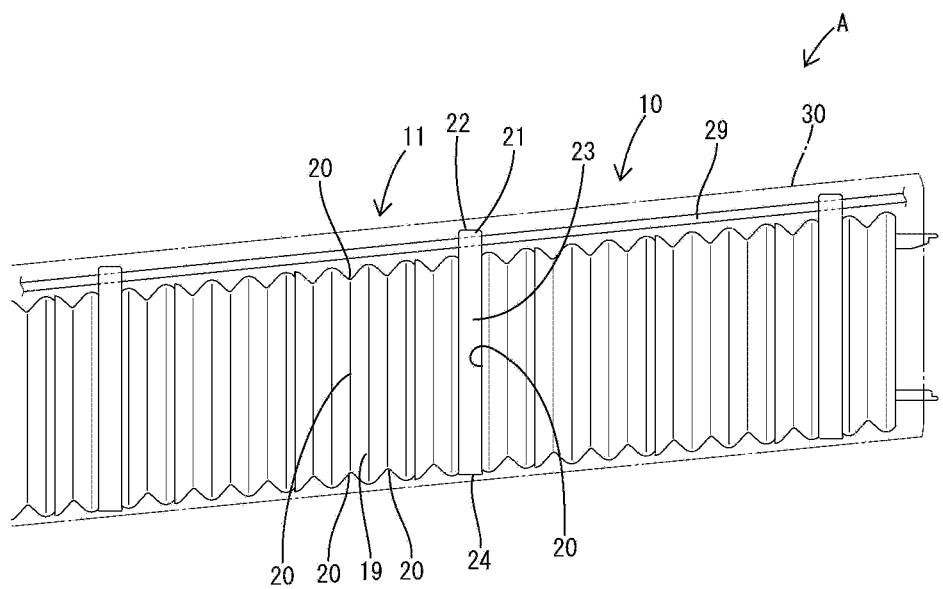
FIG. 2 is a side view of the electrical wire guiding apparatus.
Figure 3:
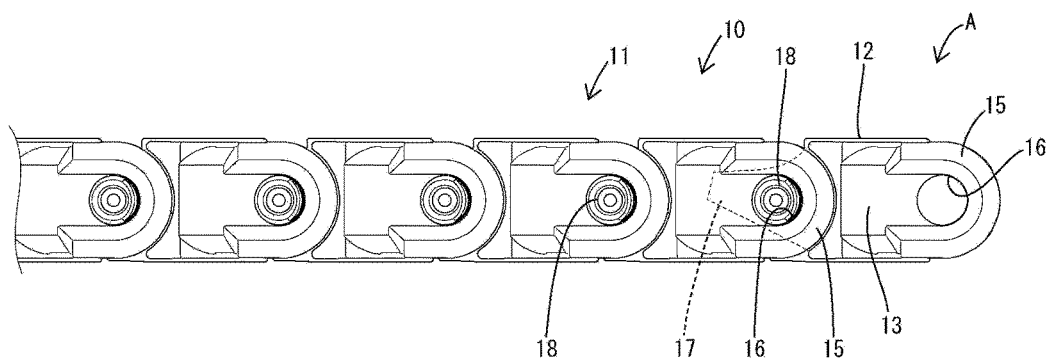
FIG. 3 is a plan view of a guiding main body.
Figure 4:
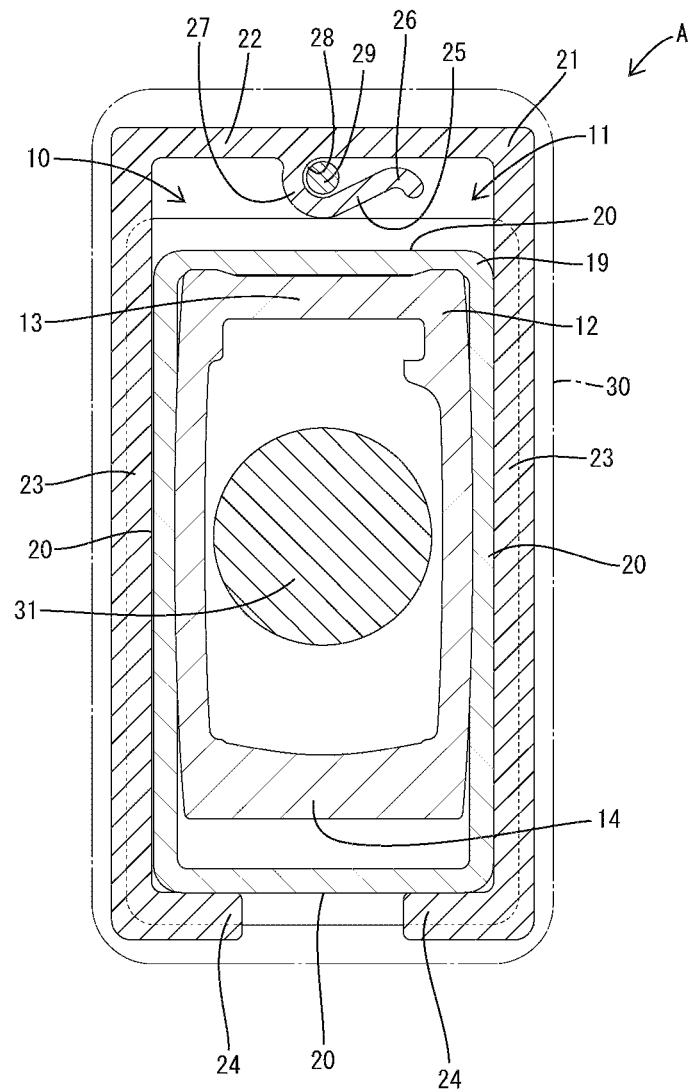
FIG. 4 is a cross-sectional view of the electrical wire guiding apparatus.

According to an aspect (a), the holding means may be a holder that has a lock portion capable of being locked to an outer surface of the electrical wire guiding body, and a holding portion capable of holding the decorative lighting part.

According to this configuration, it is possible to use an existing electrical wire guiding body.

According to an aspect (b), the holder may have an arm portion that opposes the outer surface of the electrical wire guiding body, and the holding portion may be arranged on an opposing surface of the arm portion that opposes the electrical wire guiding body.

According to this configuration, the decorative lighting part can be routed so as to follow the outer surface of the electrical wire guiding body.

According to an aspect (c) that may be used with aspect (a) or (b), the electrical wire guiding body may be capable of undergoing deformation so as to curve in an approximately horizontal plane, and the holding portion may be arranged so as to oppose an upper surface or a lower surface of the electrical wire guiding body.

According to this configuration, even when the electrical wire guiding body undergoes curving deformation, the routing length of the decorative lighting part does not change a large amount, and therefore a surplus length does not need to be ensured when setting the routing length of the decorative lighting part.

According to an aspect (d) that may be used with any of aspects (a) to (c), the electrical wire guiding body may be configured to include a guiding main body that is configured by a plurality of link members coupled in a single line and that receives insertion of the electrical wire, and a rubber boot that is bellows-shaped and envelops the guiding main body, and the lock portion may be locked to a groove portion in an outer surface of the rubber boot.

According to this configuration, the holder can be attached to the electrical wire guiding body using the groove portion in the outer surface of the rubber boot.

According to an aspect (e), the electrical wire guiding body and the holder may be enveloped by a self-adhesive cloth member that has stretchability and translucency.

According to this configuration, the holder can be hidden by the self-adhesive cloth member, thus making it possible to improve the appearance. Note that the self-adhesive cloth member is defined as a member obtained by adhering a self-adhesive agent such as natural rubber to a cloth-like member made of woven cloth or the like, and portions of the self-adhesive cloth member are brought into close contact with each other and held in the state of being in close contact with each other.

According to an aspect (f) that may be used with any of aspects (a) to (c), the electrical wire guiding body may be configured to include a guiding main body that is configured by a plurality of link members coupled in a single line and that receives insertion of the electrical wire, and a rubber boot that is bellows-shaped and envelops the guiding main body, and the holding means may be enveloped by the rubber boot.

According to this configuration, the holding means can be hidden by the rubber boot, thus making it possible to improve the appearance.

According to an aspect (g) that may be used with any of aspects (a) to (c), the electrical wire guiding body may be configured to include a guiding main body that is configured by a plurality of link members coupled in a single line and that receives insertion of the electrical wire, and a self-adhesive cloth member that envelops the guiding main body and has stretchability, a receding portion may be formed in an end surface of a shaft portion that couples link members to each other, and the lock portion may be fitted into the receding portion along with the self-adhesive cloth member.

According to this configuration, the lock portion is fitted into the receding portion along with the self-adhesive cloth member, thus making it possible to attach the holder to the electrical wire guiding body, and also making it possible to integrate the self-adhesive cloth member and the guiding main body. Note that the self-adhesive cloth member is defined as a member obtained by adhering a self-adhesive agent such as natural rubber to a cloth-like member made of woven cloth or the like, and portions of the self-adhesive cloth member are brought into close contact with each other and held in the state of being in close contact with each other.

According to an aspect (h), the holding means may be integrally formed on the electrical wire guiding body.

According to this configuration, the number of parts can be reduced compared to the case where the holding means is configured by a part that is separate from the electrical wire guiding body.

According to an aspect (i) that may be used with aspect (h), the electrical wire guiding body may be configured to include a guiding main body that is configured by a plurality of link members coupled in a single line and that receives insertion of the electrical wire, and a rubber boot that is bellows-shaped and envelops the guiding main body, and the holding means may be integrally formed on at least one of the guiding main body and the rubber boot.

According to this configuration, the number of parts can be reduced compared to the case where the holding means is configured by a part that is separate from the guiding main body and the rubber boot.

First Embodiment

Hereinafter, a first embodiment will be described with reference to FIGS. 1 to 4. An electrical wire guiding apparatus A of the first embodiment is provided so as to span a vehicle body (not shown) and a sliding door (not shown) that opens and closes a doorway in a side surface of the vehicle body, so as to span the cabin floor (not shown) of a vehicle body and a sliding seat (not shown), or the like.

A wire harness 31 (the electrical wire recited in the claims), which is for supplying electrical power to electrical components such as a sliding seat reclining apparatus and a power window installed in the sliding door, is inserted into the electrical wire guiding apparatus A (electrical wire guiding body 10). The wire harness 31 is obtained by bundling together multiple sheathed electrical wires (not shown) that function as conduction paths for power supply.

The electrical wire guiding apparatus A is configured to include one long and thin electrical wire guiding body 10, multiple holders 21 (decorative lighting part holders) for attaching a decorative lighting part 29 to the electrical wire guiding body 10, and a self-adhesive cloth member 30 that envelops the electrical wire guiding body 10, the holders 21, and the decorative lighting part 29. The holders 21 function as a holding means capable of holding the decorative lighting part 29 to the electrical wire guiding body 10. The electrical wire guiding body 10 is constituted by a guiding main body 11, which includes multiple link members 12 that are made of a synthetic resin and are coupled in a single line so as to be able to pivot relative to each other in the horizontal direction, and a rubber boot 19 that envelops the guiding main body 11 over approximately the entire length thereof.

Each of the link members 12 has a rectangular tube shape. The link member 12 is constituted by an upper plate portion 13 and a lower plate portion 14, and a pair of upper and lower bearing-side coupling portions 15, each having a circular bearing hole 16 that penetrates in the vertical direction, are formed in end portions of the upper plate portion 13 and the lower plate portion 14 on one side in the length direction of the guiding main body 11 (electrical wire guiding body 10). A shaft-side coupling portion 17 provided with a shaft portion 18 that protrudes from the upper surface thereof is formed in the end portion of the upper plate portion 13 on the other side, and a shaft-side coupling portion 17 (not shown) provided with a shaft portion 18 that protrudes from the lower surface thereof is formed in the end portion of the lower plate portion 14 on the other side. Adjacent link members 12 are coupled to each other by fitting the pair of upper and lower shaft portions 18 into the pair of upper and lower bearing holes 16, so as to be able to pivot relative to each other, in the horizontal direction, and centered about a vertical axis. The wire harness 31 is inserted into this guiding main body 11.

The rubber boot 19 has a rectangular tube shape, and is also bellows-shaped. Groove portions 20 that extend along the circumference direction are formed in the outer circumferential surface of the rubber boot 19 over the entire circumference thereof. As the guiding main body 11 (electrical wire guiding body 10) undergoes curving deformation, the rubber boot 19 follows the guiding main body 11 and undergoes curving deformation in which the widths of the groove portions 20 change.

Each of the holders 21 is made of a synthetic resin, and is an individual part that includes a long and thin horizontal arm portion 22, a pair of leg portions 23 (the lock portion recited in the claims) that respectively extend downward from the two end portions of the arm portion 22, and locking end portions 24 (the lock portion recited in the claims) that respectively protrude horizontally from the lower end portions of the pair of leg portions 23 so as to approach each other. A holding portion 25 capable of being elastically bent in the vertical direction is integrally formed on the lower surface (the inward surface that opposes the upper surface of the electrical wire guiding body 10) of the arm portion 22.

The holding portion 25 is shaped so as to extend from the lower surface of the arm portion 22 along the length direction of the arm portion 22 in a cantilevered manner. The vertical gap between an extending end portion 26 of the holding portion 25 and the lower surface of the arm portion 22 is narrower than the vertical gap between a base portion 27 of the holding portion 25 and the lower surface of the arm portion 22. Also, the space between the base portion 27 of the holding portion 25 and the lower surface of the arm portion 22 is a holding space 28 that has an arc-shaped inner surface and penetrates in the length direction of the electrical wire guiding body 10. This holding space 28 is arranged at a central position in the length direction of the arm portion 22 (the width direction of the electrical wire guiding body 10).

The decorative lighting part 29 is constituted by a wire member that is made of a clear and bendable resin, and LEDs (not shown) that serve as light sources and are embedded in the wire member. The decorative lighting part 29 is held by multiple holders 21 that are arranged with appropriate gaps therebetween in the length direction of the decorative lighting part 29. The outer diameter of the decorative lighting part 29 is approximately the same dimension as the inner diameter of the holding space 28. When the decorative lighting part 29 is attached to the holders 21, the extending end portion 26 of the holding portion 25 is moved away from the arm portion 22, and the decorative lighting part 29 is passed through the space therebetween. Accordingly, the decorative lighting part 29 is accommodated in the holding space 28 in an orientation approximately orthogonal to the arm portion 22, and is thus held in the holder 21.

The holders 21 that hold the decorative lighting part 29 are attached to the electrical wire guiding body 10 (rubber boot 19) with appropriate gaps therebetween in the length direction of the electrical wire guiding body 10. When each of the holders 21 is attached to the rubber boot 19, the holding portion 25 is placed on the upper surface of the rubber boot 19 such that the arm portion 22 opposes the upper surface of the rubber boot 19, then the leg portions 23 are fitted into portions of a groove portion 20 that are on the side surfaces of the rubber boot 19, and the locking end portions 24 are fitted into the portion of the groove portion 20 that is on the lower surface of the rubber boot 19. Accordingly, the holders 21 are held in a state in which displacement relative to the electrical wire guiding body 10 (rubber boot 19) in the vertical direction and the horizontal direction (width direction of the electrical wire guiding body 10) is restricted. Also, the holders 21 are held (positioned) in a state in which displacement relative to the electrical wire guiding body 10 in the length direction thereof is restricted.

In the state where multiple holders 21 have been attached to the electrical wire guiding body 10, one decorative lighting part 29 is routed so as to follow the upper surface of the rubber boot 19 (electrical wire guiding body 10) and extend approximately parallel to the length direction of the electrical wire guiding body 10. The routing path of the decorative lighting part 29 is a path that, in a plan view, passes through the shaft portions 18 that couple link members 12 to each other.

The self-adhesive cloth member 30 is obtained by adhering a self-adhesive agent (not shown) such as natural rubber to the two surfaces of a cloth-like member made of woven cloth or the like. Note that the self-adhesive agent may be adhered to only one side of the cloth-like member. Woven cloth or non-woven cloth having stretchability and translucency is used as the cloth-like member. Examples of the material for the cloth-like member include: natural fibers such as cotton (arboreous cotton), silk, or hemp; synthetic fibers made of polyester, polyamide, acrylic resin, polyurethane, polyethylene, polypropylene, or the like; semisynthetic fibers such as acetate fibers; and recycled fibers such as rayon fibers or cupra fibers.

The cloth-like member is shaped as an approximately rectangular sheet. The long sides of the cloth-like member are set to approximately the same dimension as the length of the electrical wire guiding body 10. The short sides of the cloth-like member are set to a dimension obtained by adding an overlap margin to the circumference of the holder 21. Here, the circumference refers to a dimension obtained by adding two times the length dimension of the arm portion 22 to the height dimensions of the two leg portions 23. Also, the overlap margin refers to a dimension that corresponds to the length dimension of the arm portion 22 or the height dimension of the leg portions 23, for example.

The self-adhesive agent has adhesiveness capable of bonding with itself. The self-adhesive agent also has adhesiveness that exhibits bonding force with the cloth-like member as well. The adhesive force of this self-adhesive agent is a strength according to which the bonding of the self-adhesive agent to itself and the bonding of the self-adhesive agent and the cloth-like member is released when non-rupturing tensile force is applied to the cloth-like member. Also, examples of materials that can be used for the self-adhesive agent include natural rubber, a mixture of natural rubber and a synthetic rubber, and an acrylic polymer.

The self-adhesive cloth member 30 is wrapped around the electrical wire guiding body 10 and the outer surfaces of the holders 21 such that the long sides extend along the length direction of the electrical wire guiding body 10, and one of the two edge portions along the long sides is overlaid on and brought into close contact with the outer surface of the other edge portion. The width dimension (or height dimension) of the overlapping region of these two edge portions is a dimension that corresponds to the aforementioned overlap margin. Also, due to the adhesive force of the self-adhesive agent, the two edge portions that extend along the long sides of the self-adhesive cloth member 30 are bonded together, and the self-adhesive cloth member 30 envelops the electrical wire guiding body 10 and the holders 21 over the entire circumference thereof and over the entire length thereof. Note that in consideration of operability during overlaying of the two edge portions along the long sides and the like, the self-adhesive cloth member 30 can be repeatedly attached and detached.

When the decorative lighting part 29 is energized, light from the decorative lighting part 29 passes through the self-adhesive cloth member 30, and that light can be visually recognized from above the electrical wire guiding body 10.

Here, the decorative lighting part 29 is routed along a path that passes through the shaft portions 18 that couple link members 12 together, and therefore even when the electrical wire guiding body 10 undergoes curving deformation, the decorative lighting part 29 is always located within the range of the width of the upper surface of the electrical wire guiding body 10. In particular, the decorative lighting part 29 passes through a space surrounded by the lower surfaces of the arm portions 22, the inner side surfaces of the upper end portions of the two leg portions 23, and the upper surface of the rubber boot 19 (electrical wire guiding body 10), and therefore there is no risk of protruding outside the total width range of the electrical wire guiding body 10.

The electrical wire guiding apparatus A of the first embodiment includes the long and thin electrical wire guiding body 10 that receives insertion of the wire harness 31 and can undergo curving deformation, and the holders 21. The holders 21 each have lock portions (leg portions 23 and locking end portions 24) that can lock to the outer surface of the electrical wire guiding body 10, and the holding portion 25 that can hold the decorative lighting part 29. In other words, the electrical wire guiding apparatus A is configured by attaching the holders 21 to the electrical wire guiding body 10. When the decorative lighting part 29 is to be attached to the electrical wire guiding body 10, it is sufficient to hold the decorative lighting part 29 in the holders 21 and then lock the holders 21 to the electrical wire guiding body 10. According to the first embodiment, the long and thin decorative lighting part 29 can be attached to the electrical wire guiding body 10 without using a member such as double sided tape that causes a hindrance to curving deformation of the electrical wire guiding body 10.

Also, each holder 21 has the arm portion 22 that opposes the outer surface of the electrical wire guiding body 10 (the upper surface of the rubber boot 19), and the holding portion 25 is arranged on the opposing surface (lower surface) of the arm portion 22 that opposes the electrical wire guiding body 10 (rubber boot 19). According to this configuration, the decorative lighting part 29 can be routed so as to follow the outer surface of the electrical wire guiding body 10. Also, the electrical wire guiding body 10 is capable of undergoing curving deformation so as to curve in an approximately horizontal plane, and the holding portion 25 is arranged so as to oppose the upper surface of the electrical wire guiding body 10. According to this configuration, even when the electrical wire guiding body 10 undergoes curving deformation, the routing length of the decorative lighting part 29 does not change a large amount, and therefore a surplus length does not need to be ensured when setting the routing length of the decorative lighting part 29.

Also, the electrical wire guiding body 10 is configured to include the guiding main body 11, which includes multiple link members 12 coupled in a single line and has the wire harness 31 inserted therein, and the bellows-shaped rubber boot 19 that envelops the guiding main body 11. Also, the leg portions 23 and the locking end portions 24, which are lock portions, are locked to the groove portions 20 in the outer surface of the rubber boot 19. According to this configuration, the attachment of the holders 21 to the electrical wire guiding body 10 can be realized using the existing groove portions 20 formed in the outer surface of the rubber boot 19 such that the rubber boot 19 can undergo curving deformation along with the guiding main body 11.

Also, the electrical wire guiding body 10 and the holders 21 are enveloped by the self-adhesive cloth member 30 that has stretchability and translucency. According to this configuration, the holders 21 can be hidden by the self-adhesive cloth member 30, thus making it possible to improve the appearance. Note that the self-adhesive cloth member 30 is defined as a member obtained by adhering a self-adhesive agent such as natural rubber to a cloth-like member made of woven cloth or the like, and portions of the self-adhesive cloth member 30 are brought into close contact with each other and held in the state of being in close contact with each other.

Second Embodiment

Figure 5:
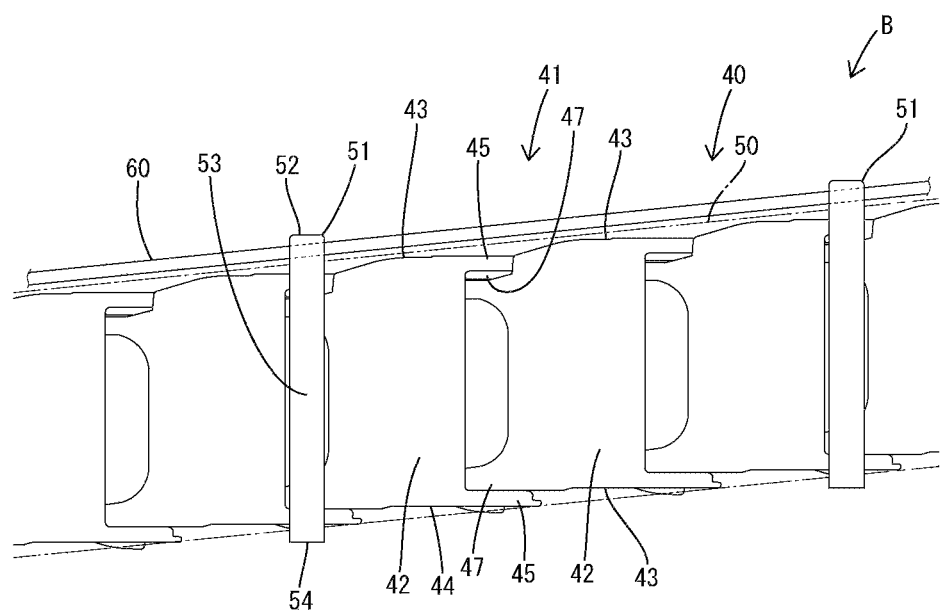
FIG. 5 is a side view of an electrical wire guiding apparatus according to a second embodiment.
Figure 6:
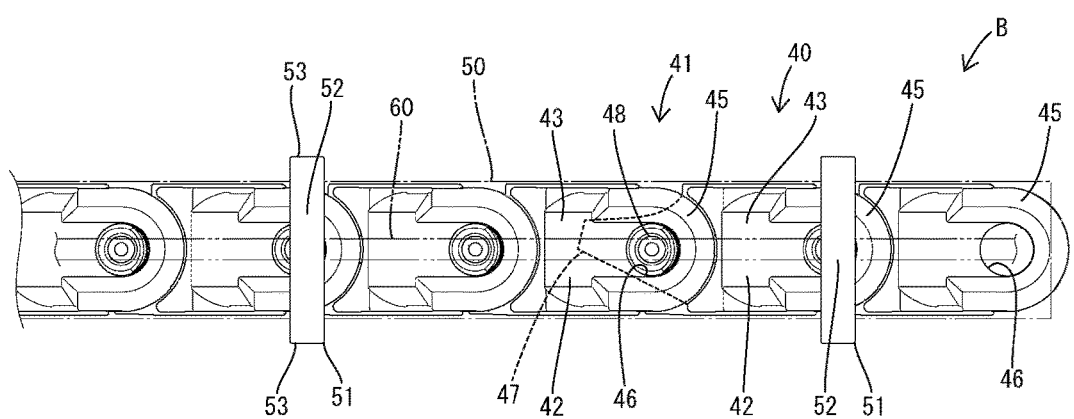
FIG. 6 is a plan view of the electrical wire guiding apparatus.
Figure 7:
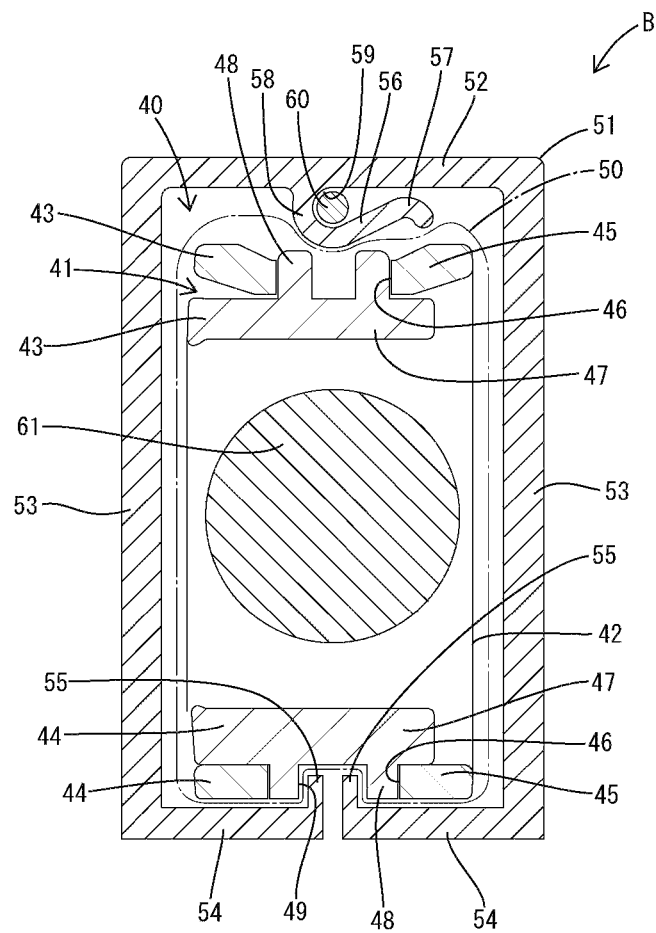
FIG. 7 is a cross-sectional view of the electrical wire guiding apparatus.

Hereinafter, a second embodiment will be described with reference to FIGS. 5 to 7. An electrical wire guiding apparatus B of the second embodiment is provided so as to span a vehicle body (not shown) and a sliding door (not shown) that opens and closes a doorway in a side surface of the vehicle body, so as to span the cabin floor (not shown) of a vehicle body and a sliding seat (not shown), or the like.

A wire harness 61 (the electrical wire recited in the claims), which is for supplying electrical power to electrical components such as a sliding seat reclining apparatus and a power window installed in the sliding door, is inserted into the electrical wire guiding apparatus B (electrical wire guiding body 40). The wire harness 61 is obtained by bundling together multiple sheathed electrical wires (not shown) that function as conduction paths for power supply.

The electrical wire guiding apparatus B is configured to include one long and thin electrical wire guiding body 40 and multiple holders 51 (decorative lighting part holders) for attaching a decorative lighting part 60 to the electrical wire guiding body 40. The holders 51 function as a holding means capable of holding the decorative lighting part 60 to the electrical wire guiding body 40. The electrical wire guiding body 40 is constituted by a guiding main body 41, which includes multiple link members 42 that are made of a synthetic resin and are coupled in a single line so as to be able to pivot relative to each other in the horizontal direction, and a self-adhesive cloth member 50 that envelops the guiding main body 41 over approximately the entire length thereof.

Each of the link members 42 has a rectangular tube shape. The link member 42 is constituted by an upper plate portion 43 and a lower plate portion 44, and a pair of upper and lower bearing-side coupling portions 45, each having a circular bearing hole 46 that penetrates in the vertical direction, are formed in end portions of the upper plate portion 43 and the lower plate portion 44 on one side in the length direction of the guiding main body 41 (electrical wire guiding body 40). A shaft-side coupling portion 47 provided with a shaft portion 48 that protrudes from the upper surface thereof is formed in the end portion of the upper plate portion 43 on the other side, and a shaft-side coupling portion 47 provided with a shaft portion 48 that protrudes from the lower surface thereof is also formed in the end portion of the lower plate portion 44 on the other side.

Adjacent link members 42 are coupled by fitting the pair of upper and lower shaft portions 48 into the pair of upper and lower bearing holes 46, so as to be able to pivot relative to each other, in the horizontal direction, and centered about a vertical axis. A wire harness 61 is inserted into this guiding main body 41.

In the state where the shaft portions 48 and the bearing holes 46 have been fitted together, the upper surface of the upper shaft portion 48 and the lower surface of the lower shaft portion 48 are respectively exposed upward and downward inside the bearing holes 46. The upper surface of the upper shaft portion 48 and the lower surface of the lower shaft portion 48 are each provided with a receding portion 49 that is exposed to the outside and is shaped as a circle that is concentric with the shaft portion 48. These receding portions 49 are formed for the purpose of thickness reduction (the reduction of the wall thickness of the shaft portion 48 in order to suppress so-called "sink mark" deformation of the shaft portion 48 that occurs during die-cast molding), but they also function as means for locking the later-described holders 51.

The self-adhesive cloth member 50 is obtained by adhering a self-adhesive agent (not shown) such as natural rubber to the two surfaces of a cloth-like member made of woven cloth or the like. Note that the self-adhesive agent may be adhered to only one side of the cloth-like member. Woven cloth or non-woven cloth having stretchability and translucency is used as the cloth-like member. Examples of the material for the cloth-like member include: natural fibers such as cotton (arboreous cotton), silk, or hemp; synthetic fibers made of polyester, polyamide, acrylic resin, polyurethane, polyethylene, polypropylene, or the like; semisynthetic fibers such as acetate fibers; and recycled fibers such as rayon fibers or cupra fibers.

The cloth-like member is shaped as an approximately rectangular sheet. The long sides of the cloth-like member are set to approximately the same dimension as the length of the electrical wire guiding body 40. The short sides of the cloth-like member are set to a dimension obtained by adding an overlap margin to the circumference of the guiding main body 41. Here, the circumference refers to a dimension obtained by adding two times the width dimension of the guiding main body 41 (link member 42) to two times the height dimension of the guiding main body 41 (link member 42). Also, the overlap margin refers to a dimension that corresponds to the width dimension of the guiding main body 41 or the height dimension of the guiding main body 41, for example.

The self-adhesive agent has adhesiveness capable of bonding with itself. The self-adhesive agent also has adhesiveness that exhibits bonding force with the cloth-like member as well. The adhesive force of this self-adhesive agent is a strength according to which the bonding of the self-adhesive agent to itself and the bonding of the self-adhesive agent and the cloth-like member is released when non-rupturing tensile force is applied to the cloth-like member. Also, examples of materials that can be used for the self-adhesive agent include natural rubber, a mixture of natural rubber and a synthetic rubber, and an acrylic polymer.

The self-adhesive cloth member 50 is wrapped around the outer surface of the guiding main body 41 such that the long sides extend along the length direction of the guiding main body 41, and one of the two edge portions along the long sides is overlaid on and brought into close contact with the outer surface of the other edge portion. The width dimension (or height dimension) of the overlapping region of these two edge portions is a dimension that corresponds to the aforementioned overlap margin. Also, due to the adhesive force of the self-adhesive agent, the two edge portions that extend along the long sides of the self-adhesive cloth member 50 are bonded together, and the self-adhesive cloth member 50 envelops the guiding main body 41 over the entire circumference thereof and over the entire length thereof.

The holders 51 are made of a synthetic resin and are attached so as to encompass the electrical wire guiding body 40. Each of the holders 51 is an individual part that includes a long and thin horizontal arm portion 52, a pair of leg portions 53 that respectively extend downward from the two end portions of the arm portion 52, and locking end portions 54 that respectively protrude horizontally from the lower end portions of the pair of leg portions 53 so as to approach each other. Also, a locking protrusion 55 (the lock portion recited in the claims) that protrudes upward is formed on the extending end of each of the locking end portions 54.

A holding portion 56 capable of being elastically bent in the vertical direction is integrally formed on the lower surface (the inward surface that opposes the upper surface of the electrical wire guiding body 40) of the arm portion 52. The holding portion 56 is shaped so as to extend from the lower surface of the arm portion 52 along the length direction of the arm portion 52 in a cantilevered manner. The vertical gap between an extending end portion 57 of the holding portion 56 and the lower surface of the arm portion 52 is narrower than the vertical gap between a base portion 58 of the holding portion 56 and the lower surface of the arm portion 52. Also, the space between the base portion 58 of the holding portion 56 and the lower surface of the arm portion 52 is a holding space 59 that has an arc-shaped inner surface and penetrates in the length direction of the electrical wire guiding body 40. This holding space 59 is arranged at a central position in the length direction of the arm portion 52 (the width direction of the electrical wire guiding body 40).

The decorative lighting part 60 is constituted by a wire member that is made of a clear and bendable resin, and LEDs that serve as light sources and are embedded in the wire member. The decorative lighting part 60 is held by multiple holders 51 that are arranged with appropriate gaps therebetween in the length direction of the decorative lighting part 60. The outer diameter of the decorative lighting part 60 is approximately the same dimension as the inner diameter of the holding space 59. When the decorative lighting part 60 is attached to the holders 51, the extending end portion 57 of the holding portion 56 is moved away from the arm portion 52, and the decorative lighting part 60 is passed through the space therebetween. Accordingly, the decorative lighting part 60 is accommodated in the holding space 59 in an orientation approximately orthogonal to the arm portion 52, and is thus held in the holder 51.

The holders 51 that hold the decorative lighting part 60 are attached to the electrical wire guiding body 40 with appropriate gaps therebetween in the length direction of the electrical wire guiding body 40. When each of the holders 51 is attached to the electrical wire guiding body 40, the holding portion 56 is placed on the upper surface of the electrical wire guiding body 40 (link member 42), via the self-adhesive cloth member 50, such that the arm portion 52 opposes the upper surface of the electrical wire guiding body 40 via the self-adhesive cloth member 50. Also, the guiding main body 41 (link member 42) is sandwiched by the pair of leg portions 53. Then the pair of locking protrusions 55 are fitted into the portion of a receding portion 49 on the lower surface side.

Accordingly, the holders 51 are held in a state in which displacement relative to the electrical wire guiding body 40 (guiding main body 41) in the length direction is restricted, and displacement relative to the electrical wire guiding body 40 in the vertical direction and the horizontal direction (width direction of the electrical wire guiding body 40) is restricted. Also, when the locking protrusions 55 are fitted into the receding portions 49, the self-adhesive cloth member 50 is pressed into the receding portions 49 by the locking protrusions 55. Accordingly, the self-adhesive cloth member 50 is held in a state where displacement relative to the guiding main body 41 in the length direction and the circumference direction is restricted.

In the state where multiple holders 51 have been attached to the electrical wire guiding body 40, one decorative lighting part 60 is routed so as to follow the upper surface of the electrical wire guiding body 40 (self-adhesive cloth member 50) and extend approximately parallel to the length direction of the electrical wire guiding body 40. The routing path of the decorative lighting part 60 is a path that, in a plan view, passes through the shaft portions 48 that couple link members 42 to each other.

When the decorative lighting part 60 is energized, light from it can be visually recognized from above the electrical wire guiding body 40. Here, the decorative lighting part 60 is routed along a path that passes through the shaft portions 48 that couple link members 42 together, and therefore even when the electrical wire guiding body 40 undergoes curving deformation, the decorative lighting part 60 is always located within the range of the width of the upper surface of the electrical wire guiding body 40. In particular, the decorative lighting part 60 passes through a space surrounded by the lower surfaces of the arm portions 52, the inner side surfaces of the upper end portions of the two leg portions 53, and the upper surface of the electrical wire guiding body 40 (link member 42), and therefore there is no risk of protruding outside the total width range of the electrical wire guiding body 40.

The electrical wire guiding apparatus B of the second embodiment includes the long and thin electrical wire guiding body 40 that receives insertion of the wire harness 61 and can undergo curving deformation, and the holders 51. The holders 51 each have lock portions (locking protrusions 55) that can lock to the outer surface of the electrical wire guiding body 40, and the holding portion 56 that can hold the decorative lighting part 60. In other words, the electrical wire guiding apparatus B is configured by attaching the holders 51 to the electrical wire guiding body 40. When the decorative lighting part 60 is to be attached to the electrical wire guiding body 40, it is sufficient to hold the decorative lighting part 60 in the holders 51 and then lock the holders 51 to the electrical wire guiding body 40. According to the second embodiment, the long and thin decorative lighting part 60 can be attached to the electrical wire guiding body 40 without using a member such as double sided tape that causes a hindrance to curving deformation of the electrical wire guiding body 40.

Also, each holder 51 has the arm portion 52 that opposes the outer surface (upper surface) of the electrical wire guiding body 40, and the holding portion 56 is arranged on the opposing surface (lower surface) of the arm portion 52 that opposes the electrical wire guiding body 40. According to this configuration, the decorative lighting part 60 can be routed so as to follow the outer surface of the electrical wire guiding body 40. Also, the electrical wire guiding body 40 is capable of undergoing curving deformation so as to curve in an approximately horizontal plane, and the holding portion 56 is arranged so as to oppose the upper surface of the electrical wire guiding body 40. According to this configuration, even when the electrical wire guiding body 40 undergoes curving deformation, the routing length of the decorative lighting part 60 does not change a large amount, and therefore a surplus length does not need to be ensured when setting the routing length of the decorative lighting part 60.

Also, the electrical wire guiding body 40 is configured to include the guiding main body 41, which includes multiple link members 42 coupled in a single line and has the wire harness 61 inserted therein, and the self-adhesive cloth member 50 that has stretchability and envelops the guiding main body 41. Also, the receding portions 49 are formed in the end surfaces of the lower shaft portions 48 that couple link members 42 to each other, and the locking protrusions 55 are fitted into the receding portions 49 along with the self-adhesive cloth member 50. Accordingly, the holders 51 can be attached to the electrical wire guiding body 40, and the self-adhesive cloth member 50 and the guiding main body 41 can be integrated. Note that the self-adhesive cloth member 50 is defined as a member obtained by adhering a self-adhesive agent such as natural rubber to a cloth-like member made of woven cloth or the like, and portions of the self-adhesive cloth member 50 are brought into close contact with each other and held in the state of being in close contact with each other.

Third Embodiment

Figure 8:
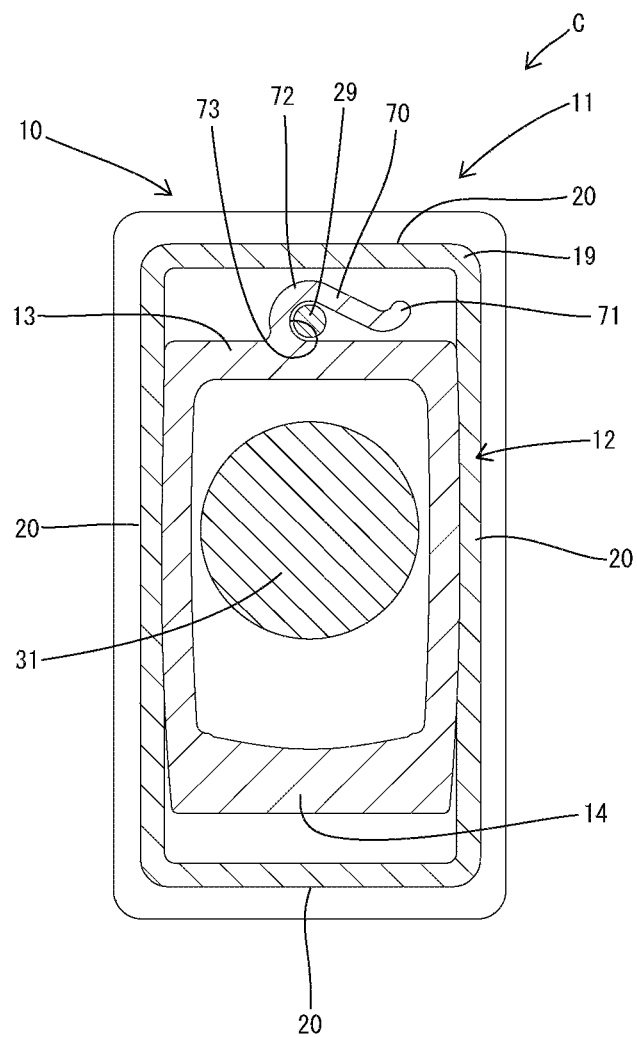
FIG. 8 is a cross-sectional view of an electrical wire guiding apparatus according to a third embodiment.

Hereinafter, a third embodiment will be described with reference to FIG. 8. In the electrical wire guiding apparatus A of the first embodiment, the holders 21, which are parts separate from the electrical wire guiding body 10, are used as the means for attaching the decorative lighting part 29 to the electrical wire guiding body 10. However, in an electrical wire guiding apparatus C of the third embodiment, instead of the holders 21, multiple holding portions 70 (the holding means recited in the claims) are integrally formed on the electrical wire guiding body 10 as the means for attaching the decorative lighting part 29 to the electrical wire guiding body 10. Likewise to the first embodiment, the electrical wire guiding body 10 is constituted by a guiding main body 11, which includes multiple link members 12 that are coupled in a single line so as to be able to pivot relative to each other in the horizontal direction, and a rubber boot 19 that envelops the guiding main body 11 over approximately the entire length thereof. Note that in the electrical wire guiding apparatus C of the third embodiment, the appearance is maintained by the rubber boot 19, and therefore the self-adhesive cloth member 30 for appearance improvement is not provided.

Each of the holding portions 70 is shaped so as to protrude from the upper surface (outer surface) of the upper plate portion 13 of a link member 12, and is formed so as to be integrated with the link member 12. Note that the holding portion 70 may be formed on all of the link members 12, and a configuration is possible in which the holding portion 70 is formed on only link members 12 with a predetermined gap therebetween among all of the link members 12.

The holding portions 70 are each shaped so as to extend from the upper surface of the upper plate portion 13 along the width direction of the upper plate portion 13 in a cantilevered manner. The vertical gap between an extending end portion 71 of the holding portion 70 and the upper surface of the upper plate portion 13 is narrower than the vertical gap between a base portion 72 of the holding portion 70 and the upper surface of the upper plate portion 13. Also, the space between the base portion 72 of the holding portion 70 and the upper surface of the upper plate portion 13 is a holding space 73 that has an arc-shaped inner surface and penetrates in the length direction of the electrical wire guiding body 10. This holding space 73 is arranged at a central position in the width direction of the upper plate portion 13 (electrical wire guiding body 10). The long and thin decorative lighting part 29 is held in a state of being accommodated within multiple holding spaces 73. Also, the holding portions 70 and the decorative lighting part 29 are enveloped by the rubber boot 19.

Fourth Embodiment

Figure 9:
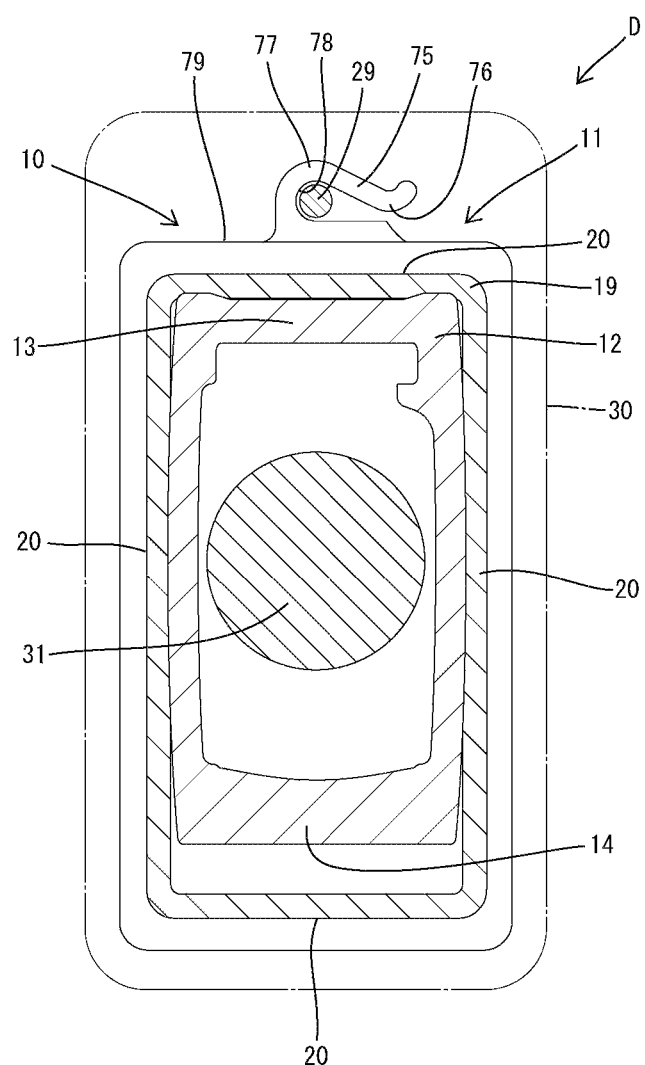
FIG. 9 is a cross-sectional view of an electrical wire guiding apparatus according to a fourth embodiment.

Hereinafter, a fourth embodiment of will be described with reference to FIG. 9. In the electrical wire guiding apparatus A of the first embodiment, the holders 21, which are parts separate from the electrical wire guiding body 10, are used as the means for attaching the decorative lighting part 29 to the electrical wire guiding body 10. However, in an electrical wire guiding apparatus D of the fourth embodiment, instead of the holders 21, multiple holding portions 75 (the holding means recited in the claims) are integrally formed on the electrical wire guiding body 10 as the means for attaching the decorative lighting part 29 to the electrical wire guiding body 10. Likewise to the first embodiment, the electrical wire guiding body 10 is constituted by a guiding main body 11, which includes multiple link members 12 that are coupled in a single line so as to be able to pivot relative to each other in the horizontal direction, and a rubber boot 19 that is shaped as a rectangular tube and envelops the guiding main body 11 over approximately the entire length thereof.

Each of the holding portions 75 is shaped so as to protrude from the upper surface (outer surface) of an upper surface portion 79 of the rubber boot 19, and is formed so as to be integrated with the rubber boot 19. The holding portions 75 are each shaped so as to extend from the upper surface of the upper surface portion 79 along the width direction of the upper surface portion 79 in a cantilevered manner. The vertical gap between an extending end portion 76 of the holding portion 75 and the upper surface of the upper surface portion 79 is narrower than the vertical gap between a base portion 77 of the holding portion 75 and the upper surface of the upper surface portion 79. Also, the space between the base portion 77 of the holding portion 75 and the upper surface of the upper surface portion 79 is a holding space 78 that has an arc-shaped inner surface and penetrates in the length direction of the electrical wire guiding body 10. This holding space 78 is arranged at a central position in the width direction of the upper surface portion 79 (electrical wire guiding body 10). The long and thin decorative lighting part 29 is held in a state of being accommodated within multiple holding spaces 78. Also, the holding portions 75 and the decorative lighting part 29 are enveloped by the self-adhesive cloth member 30.

Fifth Embodiment

Figure 10:
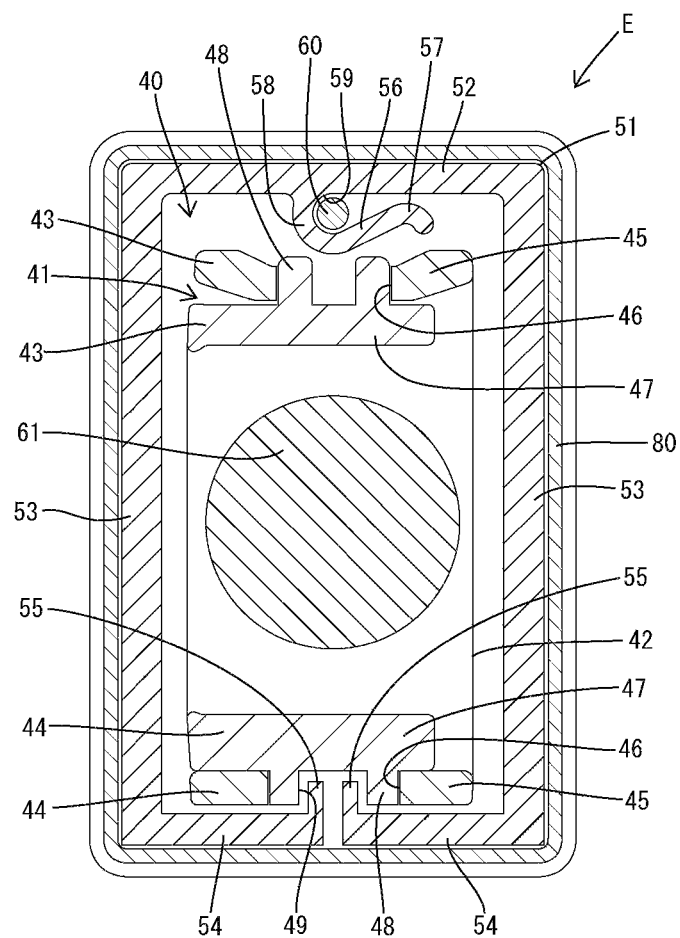
FIG. 10 is a cross-sectional view of an electrical wire guiding apparatus according to a fifth embodiment.

Hereinafter, a fifth embodiment will be described with reference to FIG. 10. In the electrical wire guiding apparatus B of the second embodiment, the holders 51, which are the means for attaching the decorative lighting part 60 to the electrical wire guiding body 40, are exposed on the outer surface of the electrical wire guiding apparatus B. However, in an electrical wire guiding apparatus E of the fifth embodiment, the electrical wire guiding body 40, the holders 51, and the decorative lighting part 60 are enveloped by a bendable rubber boot 80 that is bellows-shaped and shaped as a rectangular tube. In the electrical wire guiding apparatus E, the appearance is maintained by the rubber boot 80, and therefore the self-adhesive cloth member 50 provided in the electrical wire guiding apparatus B of the second embodiment is not provided in the electrical wire guiding apparatus E.

Other Embodiments

The present invention is not limited to the embodiments described above using the foregoing description and drawings, and embodiments such as the following are also encompassed in the technical scope of the present invention.

In the first, second, and fifth embodiments, the holding portion that holds the decorative lighting part is arranged on the inward surface (surface that opposes the electrical wire guiding body) of the arm portion of the holder, but the holding portion may be arranged on the outward surface of the arm portion.

Although the decorative lighting part is routed along the upper surface of the electrical wire guiding body in the first to fifth embodiments, the decorative lighting part may be routed along the lower surface or a side surface of the electrical wire guiding body.

Although the electrical wire guiding body, the holders, and the decorative lighting part are enveloped by the self-adhesive cloth member in the first embodiment, a configuration is possible in which the electrical wire guiding body, the holders, and the decorative lighting part are not enveloped by the self-adhesive cloth member and are exposed.

In the first to fourth embodiments, the self-adhesive cloth member is shaped as an approximately rectangular sheet having long sides with approximately the same dimension as the overall length of the electrical wire guiding body and short sides with a dimension somewhat larger than the circumference of the electrical wire guiding body, but the self-adhesive cloth member may have a tape-like shape. In this case, the self-adhesive cloth member need only be wrapped in a spiral manner around the electrical wire cover.

Although the holding means is formed on only either the guiding main body or the rubber boot in the third and fourth embodiments, there is no limitation to this, and the holding means may integrally formed on both the guiding main body and the rubber boot. In this case, the decorative lighting part may be held by both of the holding means.

Although the electrical wire guiding body and the decorative lighting part are enveloped by the self-adhesive cloth member in the third and fourth embodiments, a configuration is possible in which the electrical wire guiding body and the decorative lighting part are not enveloped by the self-adhesive cloth member and are exposed.

In the third and fourth embodiments, the electrical wire guiding body includes the guiding main body and the rubber boot, and the holding means is integrally formed on the guiding main body or the rubber boot, but in the case where the electrical wire guiding body includes a part other than the guiding main body and the rubber boot, the holding means may be integrally formed on that part other than the guiding main body and the rubber boot.

Although the guiding main body is configured by multiple link members that are coupled in a single line in the first to fourth embodiments, the guiding main body may be an elongated single-piece tubular part that is bendable, such as a corrugated tube made of a synthetic resin.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electrical wire guiding apparatus comprising:
   an electrical wire guiding body that is long and thin, receives insertion of an electrical wire, and is capable of undergoing curving deformation; and
   a holding means capable of holding a decorative lighting part to the electrical wire guiding body.

2. The electrical wire guiding apparatus according to claim 1, wherein the holding means is a holder that has a lock portion capable of being locked to an outer surface of the electrical wire guiding body, and a holding portion capable of holding the decorative lighting part.

3. The electrical wire guiding apparatus according to claim 2, wherein the holder has an arm portion that opposes the outer surface of the electrical wire guiding body, and the holding portion is arranged on an opposing surface of the arm portion that opposes the electrical wire guiding body.

4. The electrical wire guiding apparatus according to claim 2, wherein the electrical wire guiding body is capable of undergoing deformation so as to curve in an approximately horizontal plane, and the holding portion is arranged so as to oppose an upper surface or a lower surface of the electrical wire guiding body.

5. The electrical wire guiding apparatus according to claim 2, wherein the electrical wire guiding body is configured to include a guiding main body that is configured by a plurality of link members coupled in a single line and that receives insertion of the electrical wire, and a rubber boot that is bellows-shaped and envelops the guiding main body, and the lock portion is locked to a groove portion in an outer surface of the rubber boot.

6. The electrical wire guiding apparatus according to claim 5, wherein the electrical wire guiding body and the holder are enveloped by a self-adhesive cloth member that has translucency.

7. The electrical wire guiding apparatus according to claim 1, wherein the electrical wire guiding body is configured to include a guiding main body that is configured by a plurality of link members coupled in a single line and that receives insertion of the electrical wire, and a rubber boot that is bellows-shaped and envelops the guiding main body, and the holding means is enveloped by the rubber boot.

8. The electrical wire guiding apparatus according to claim 2, wherein the electrical wire guiding body is configured to include a guiding main body that is configured by a plurality of link members coupled in a single line and that receives insertion of the electrical wire, and a self-adhesive cloth member that envelops the guiding main body and has stretchability, a receding portion is formed in an end surface of a shaft portion that couples link members to each other, and the lock portion is fitted into the receding portion along with the self-adhesive cloth member.

9. The electrical wire guiding apparatus according to claim 1, wherein the holding means is integrally formed on the electrical wire guiding body.

10. The electrical wire guiding apparatus according to claim 9, wherein the electrical wire guiding body is configured to include a guiding main body that is configured by a plurality of link members coupled in a single line and that receives insertion of the electrical wire, and a rubber boot that is bellows-shaped and envelops the guiding main body, and the holding means is integrally formed on at least one of the guiding main body and the rubber boot.

11. A decorative lighting part holder,
    wherein an electrical wire guiding apparatus is configured by attaching the decorative lighting part holder to an electrical wire guiding body that is long and thin, receives insertion of an electrical wire, and is capable of undergoing curving deformation, and
    the decorative lighting part holder comprises a lock portion capable of being locked to an outer surface of the electrical wire guiding body, and a holding portion capable of holding the decorative lighting part.

* * * * *